INVENTOR.
PHILIP E. CURRY
BY
Stanley M. Tarter
ATTORNEY

United States Patent Office

3,420,725
Patented Jan. 7, 1969

3,420,725
JOINING FABRIC SEAMS WITH
THERMOPLASTIC MATERIALS
Philip E. Curry, Pensacola, Fla., assignor to Monsanto
Company, St. Louis, Mo., a corporation of Delaware
Filed June 23, 1965, Ser. No. 466,301
U.S. Cl. 156—305                          2 Claims
Int. Cl. B29c 6/04; B29f 1/00

ABSTRACT OF THE DISCLOSURE

Stitchless piecing together of textile fabric is accomplished by injecting under pressure a solution of urethane elastomeric resin into overlapped fabric portions and heating the fabric to evaporate the solvent therefrom.

---

Figure 1:
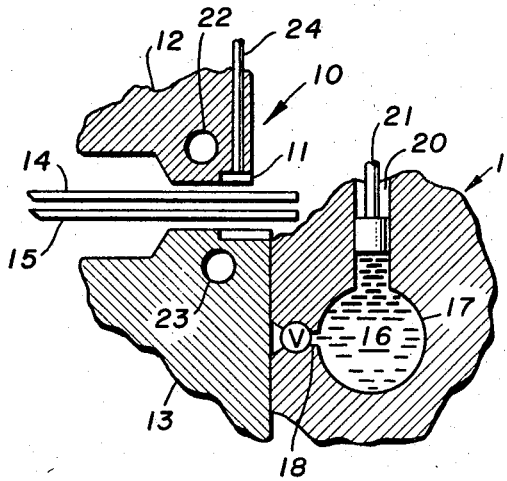

This invention is concerned with stitchless piecing together of textile fabric and is more particularly concerned with a method of joining together at a seam two or more pieces of fabric, wherein the seam is bonded together with thermoplastic material rather than with conventional stitches of thread. Specifically, the method comprises the application of a solution of thermoplastic elastomeric material to the seam junction and removing the solvent by heating the solution in the mold, polyurethanes being the preferred thermoplastic material.

Fabrics are ordinarily joined together at seams by means of stitches of thread having a composition similar to that of the fabric being seamed. In heavy industrial fabric structures seam appearance is usually secondary to strength, so that strong stitching thread may be chosen irrespective of fabric material. The joining of a light weight fabric to a heavy fabric presents a special problem since fine scale stitching is essential if the light weight fabric is to be adequately secured at the seam.

In apparel fabric structures and other textile applications appearance, as well as strength of the seam, is of great importance so that the choice of stitching thread is much more restricted. Not uncommonly, the injudicious use of natural fiber stitching thread with synthetic fiber fabrics, or of synthetic fiber thread with natural fiber fabric, results in an unsightly puckered seam that also easily pulls apart at locally stressed regions in the seam.

The making of adequate seams has been further complicated by the advent of and widespread use of "stretch fabric" in apparel and in fitted coverings. Sewn seams tend to lack the recoverable extensibility of the fabric itself. Use of stretch-type thread similar to that in the fabric only partially avoids this difficulty; variations in tension in the stretch thread during sewing tend to lead to "bunching," analogous to ordinary puckering. Moreover, the lack of uniform stretch in the seam unpleasantly restricts the free movement of the wearer of the garment.

The method of the invention mitigates or substantially overcomes the above mentioned practical problems by providing a neat, strong seam bond that is extensible well beyond the normal stretch range of common apparel and can sustain extension without rupture, and fully recovers its form when the local stress subsides. The seam line or finish line is sharply and accurately defined, comparable to seams with the finest of stitches, and is relatively inexpensive to produce.

It must be emphasized that the method of the invention does not comprise the step of merely "sticking" or "gluing" the fabrics together with a polyurethane binder. In order to produce the strong durable seam characteristic of this invention, it is essential that the polymer actually surround and enclose the fibers comprising the seam of the fabric. For this reason the solution of the urethane resin should thoroughly permeate the fabric.

It is an object of this invention to provide a method of stitchless piecing together textile fabric along a seam such that as the fabric stretches the seam will likewise stretch.

Other objects will become apparent.

In accordance with the method of the invention, the edges or portions of the fabric material are brought together in overlapped relation to form a seam line. Then, at least a part of the overlapped fabric portions is held together securely, preferably in a confined zone. This can be done by clamping the fabric in a mold form designed to restrict the thermoplastic binder to a finish line. Binder in solution, preferably a urethane elastomeric resin, is placed on the fabric portions. One can accomplish this step by injecting the resin into the mold space surrounding the seam edge so that the polymer penetrates into the interstices of the fabric, completely surrounding the thread bundles forming the fabric selvage. The bonding polymer solution is heated until the solvent evaporates. Any excess polymer and fabric projecting beyond the finished seam margin may be trimmed off before the mold is parted. Sometimes it is preferable to trim the fabric prior to molding the seam or to trim after the mold is removed.

The invention provides a fabric constructed of stretchable yarn. The fabric is characterized by having portions thereof stitchlessly seamed together by a urethane elastomeric resin. The resin fills the filamentary interstices of the fabric along the seam. As the fabric is stretched, the seam will likewise stretch without bursting.

The method of the invention is particularly advantageous for automatic or semiautomatic operation, all steps of the process being readily programmed to follow a simple timed cyclic sequence. Pneumatic actuation of the movements of the apparatus and polymer solution flow is especially suitable, but it is apparent that many other means are also suitable. Simple mechanical linkages to a prime mover or more elaborate electromagnetic drivers and electronic controls may be adapted to the process of the invention.

The method of the invention may be understood by reference to the attached drawings which show schematically a complete cycle of operations according to the invention. All drawings are in section, it being understood that the apparatus actually extends outwardly and rearwardly of the plane of the drawing.

FIGURE 1 illustrates the loading stage. Mold member 10 forming a long narrow groove 11 is divided into upper and lower portions 12 and 13 that may be brought together and be held by a clamping device. The pieces of fabrics 14 and 15 to be seamed are placed between the two (or more) mold parts at the parting plane. Usually the paired pieces of fabric are extended slightly beyond the mold surface as indicated.

A supply of seam-forming polymer in solution 16 is contained in a long plenum 17 having a number of ports 18 in a polymer ejector 19 opening to the exterior surface that mates flush against the mold inlet; the port may be a single long slit-orifice or it may comprise several small circular capillaries aligned to register with the mold inlet. When forming more complicated seams which do not lie in a single plane, multiple simple round ports are usually preferable. An injection cylinder 20 with plunger 21 or other means of providing a controlled flow of polymer solution to groove 11 opens into the polymer plenum.

Figure 2:
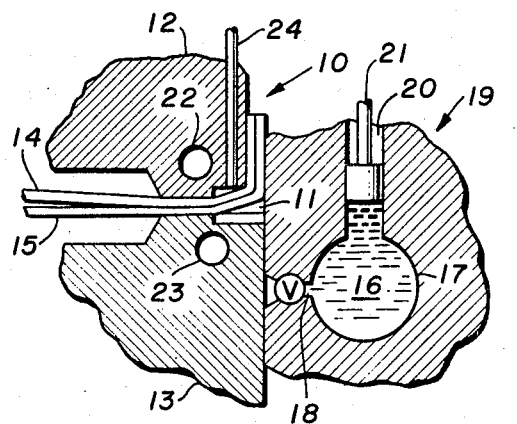

In FIGURE 2 the second stage of normal operation is shown. Mold 10 is closed, thereby clamping fabric 14 and fabric 15 in place, and the mold moves downward relative to the polymer injector, the common surfaces of these two members being in sliding contact.

Relative movement continues until, as shown in FIG-URE 3, the polymer supply ports 18 register with the open side of the mold provided by groove 11, this movement having pushed the excess fabric up into the space between the relieved surface of the upper mold portion of the mold and the surface of the lower mold portion. The injection plunger 21 is moved inward forcing polymer solution into the mold under sufficient pressure to insure that all interstices between the threads are filled; a small quantity of polymer containing solution may flow into the excess fabric in the relief space. Supply ports 18 are provided with check valves for permitting flow of the polymer only in the direction of groove 11.

Figure 4:
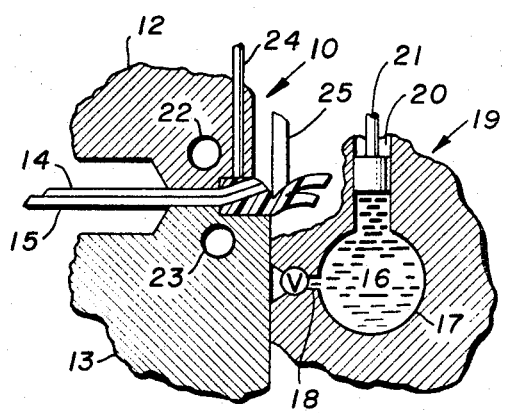

Following the injection stage, the fabrics are heated. This may be done by circulating a heating gas or liquid moving in heat exchange relationship in conduits 22 and 23 or through the use of other heating means such as an electrical heating element. At the same time, the mold member begins its upward movement relative to the injector, the solution at the seam having been evaporated and removed through vent 24 before the outer molded surface is completely exposed. A guillotine-type cutting edge 25 moves down subsequently, trimming off the excess polymer and fabric, as indicated in FIGURE 4, to provide a neat even margin.

Figure 5:
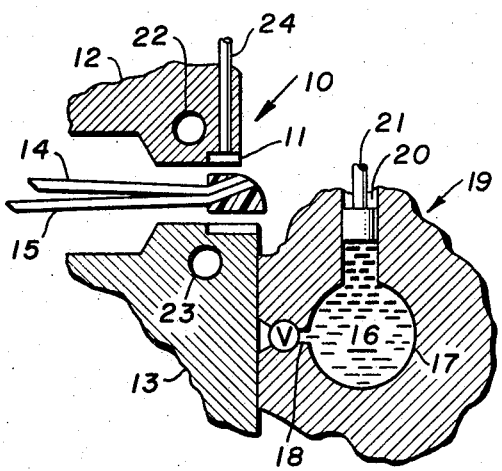
Figure 6:
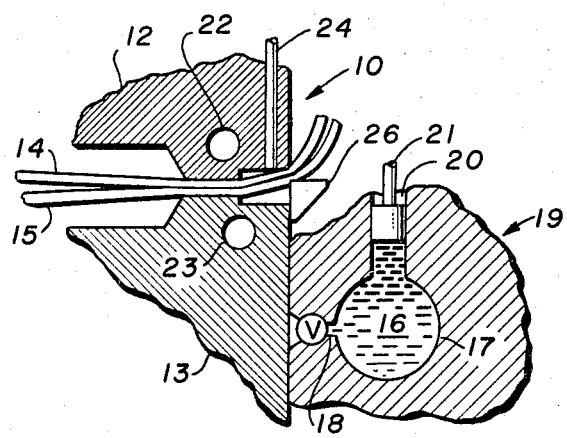

FIGURE 5 shows the mold in an opened portion after the stitchless piecing of the fabric has been accomplished and the fabric is ready for removal therefrom.

An alternate variation, suitable with woven fabrics, is to provide a cutting edge on the opposed face of the injector assembly, this cutting edge trimming off the excess fabric evenly prior to the injection step, as shown in FIG-URE 6.

Figure 7:
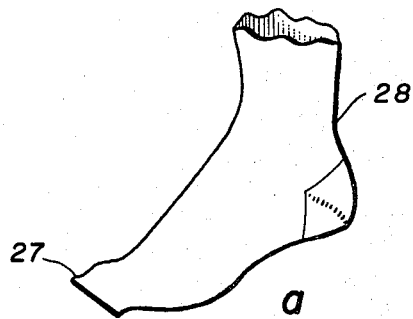
Figure 7:
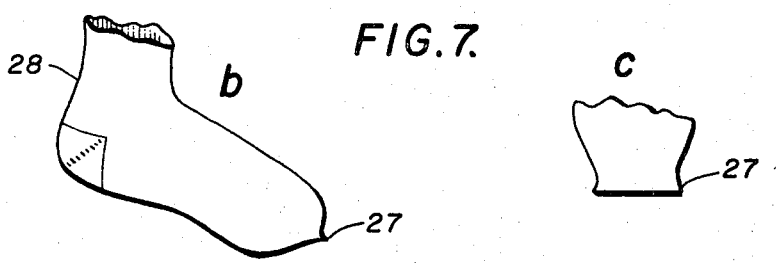

FIGURE 7 shows in various views the joining together of the toe portion 27 of a stocking 28. In the manufacture of hose, particularly ladies' sheer hose, the piecing together of the toe is an operation requiring much labor expense. Mere binding the normally open toe portion with non-elastic resin does not impart to the hose the comfort desired. However, by the hose of the present invention the toe portion is satisfactorily joined and the fabric will stretch at the point of jointure with east to provide satisfactory comfort to the wearer.

The method of the invention is readily adaptable to binding fabrics together generally, the major capital cost being that of the molds for a particular type of seam. Molds may be readily devised to form the common plain seam, lap seam, felled seam, etc. Although a parting plane surface is illustrated in the mold of FIGURE 1, the mold may be made of a plurality of parts forming a non-planer parting surface.

The method of the invention is particularly advantageous in the seaming of the smaller component parts of garments, all of which parts are substantially identical, such as pockets for trousers and jackets, collars and cuffs.

The particular polyurethane and solvent to be used depends upon the fabric material and upon the requirements of the seam.

Urethane elastomer resins are prepared from the addition reaction of active-hydrogen-containing linear polymers such as polyesters, polyethers, polyesteramides, etc. with organic diisocyanates. As an example of the type of polyesters which are reacted with the diisocyanates, saturated aliphatic products of a molecular weight of 400–10,000 are preferred and are prepared from acids such as malonic acid, succinic acid, sebacic acid, suberic acid, etc., and glycols such as ethylene glycol, trimethylene glycol, 1,2-propylene glycol, 1,3-butylene glycol, 1,4-butylene glycol, 1,6-hexane diol, etc. As an example of the type of polyethers which are reacted with the diisocyanates, polyethylene glycol, polypropylene glycol, polytetramethylene ether glycol, and other polyalkyene oxide polymers are suitable and usually have a molecular weight of 400–10,000. As an example of the type of diisocyanates which are reacted as above described p-phenylene diisocyanate, 3,3'-bitolylene-4,4'-diisocyanate, diphenylmethane-4,4'-diisocyanate are suitable. The polyisocyanate-modified polymer can be reacted with conventional polyurethane curing agents such as triols and tetrols, polyfunctional amines, aminoalcohols, and the like. By varying the proportions of the components used in preparing the polyurethane plastics and by varying the reaction conditions, it is possible to produce elastomeric products having properties in regard to strength, elasticity, and plasticity which are predetermined for the particular application in the joining of fabrics in accordance with this invention.

Any suitable solvent may be used. Preferably the solvent is relatively volatile, does not degrade the polymer or fabric, and is not too corrosive or obnoxious for other reasons. The most preferred solvents are N,N'-dimethylacetamide and N,N'-dimethylformamide. The resulting solution ought to be 100,000–500,000 c.p. (centipoise) viscosity and 20–30% polymer.

Commercial polyurethane compositions are produced in a variety of grades that have differing tensile and elastic characteristics. For seams of garments or fitted covers made of stretch fabrics, a polyurethane having great elasticity is preferred, while other structures of more stable fabrics may utilize a polyurethane composition that is less elastic. The polymer must be able to dissolve, without extensive degradation, during the period it is in the solution stage; many commercial polyurethane resins meet this requirement and may be maintained in solution for a long period of time without significant breakdown. Polyurethanes made more heat stable by the addition of phosphorous compounds or by use of chlorinated hydrocarbons are, of course, highly satisfactory; other additives which change the dyeing characteristics of the polyurethane are advantageous in many seams.

The invention is particularly applicable to stretch fabrics which are normally constructed of highly stretchable yarns. These yarns are elastic and have the ability to accept a slight longitudinally applied stress and thereby to become easily extended a considerable length without permanent elongation thereof. For example, the yarns can be elongated 10–100% and even much higher from their untensioned or relaxed length and immediately recover from such elongation. One stretchable yarn finding wide use in the textile industry today is curled yarn made of nylon or other suitable thermoplastic fiber-forming polymer. The yarn is curled by a false-twist setting operation, by being passed over a sharp edge or other techniques. Another type of stretchable yarn is one having an inherently high amount of elasticity such as spandex yarn, the fiber-forming substance of which is a long chain synthetic elastomer comprised of at least 85% of a segmented polyurethane.

EXAMPLE

Seam-forming apparatus is constructed as indicated schematically in FIGURE 1, primarily for closing seams in ladies' sheer knitted hosiery.

Upper and lower portions of a mold are made which together form a straight groove 5 inches long, 0.050 inch deep and 0.006 inch wide. The parting plane between the two halves of the mold is a surface 0.10 inch wide by 6 inches long; the fabric to be bonded is laid across this surface and is clamped in place as the two parts of the mold are brought together as shown in FIGURE 2. The vertical surface of the upper portion is relieved 0.005 inch to permit excess fabric to overlap without binding the polymer injection member as it is mated against the mold. This apparatus provides a single trimmed seam 0.050 inch wide with a thickness of 0.006 inch plus the doubled fabric thickness, and with a maximum length of 5 inches. A second mold is made having the same form and dimensions except that the slot width is 0.01 inch instead of 0.006 inch; both molds are made of tool steel.

Figure 3:
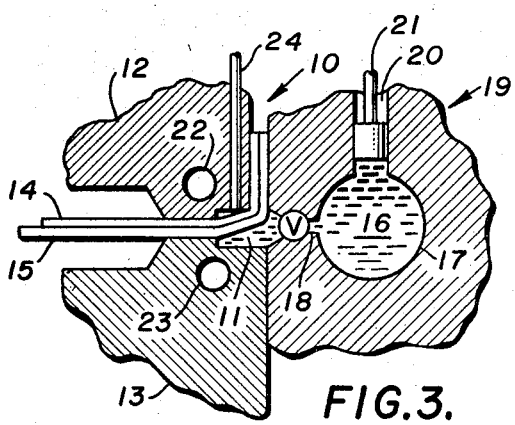

The polymer injection member is made similar to that indicated in FIGURES 1-3. The cylinder and plunger piston are 0.50 inch in diameter, and a polymer port opens to to the surace mating against the mold. The plunger is actuated manually by a pivoted lever with a large mechanical advantage so that very high pressure is easily applied to the small quantity of polymer extruded. A charge of urethane elastomeric resin dissolved in N,N'-dimethylacetamide is simply fed into the cylinder and plenum.

Standard-construction ladies' seamless hosiery is knitted on a circular knitter using 50–17 nylon yarn in the welt and 15–1 nylon yarn in the leg and foot portions of the hose. The toe of the hose is open and would be closed ordinarily with a looper or be stitched. FIGURE 7 illustrates the two different seam lines used in applying the method of the invention. FIGURE 7(a) indicates a straight seam that is sometimes used with less expensive hosiery, and FIGURE 7(b) indicates a seam closely following the normal looper line in higher quality hosiery. Both types of seams are readily formed with the apparatus described previously.

The two edges of the toe fabric to be seamed are placed between the mold parts and extend about 1/16 inch beyond the binding area defined by the groove, as indicated in FIGURE 1. Force is applied to the plunger, extruding a sufficient amount of the solution of elastomer into the groove. The groove is heated to evaporate the solvent. After removal of the injector, the edge or selvage is trimmed by a guillotine stroke as indicated in FIGURE 4, and the mold is removed; the finished seam is about 0.05 inch wide and about 0.015 inch thick.

Several different grades of polymer were examined and one judged highly suitable for hosiery seams was formed from a polyester of adipic acid and ethylene glycol modified with a mixture of 2,4-tolylene diisocyanate and diphenylmethane-4,4'-diisocyanate. The isocyanate modified polyester had a molecular weight of about 3500 and was chain-extended with ethylene diamine to obtain an ultimate polymer of about 35,000 molecular weight. When polymer simply penetrates between the two parts of the seam, in effect "sticking them together," the seam is neat- appearing but quite weak and is easily frayed. On the other hand, when the polymer properly fills the interstices, completely encapsulating the fabirc threads, the seam is remarkably strong and durable. The seam is often stronger than the fabric itself; under applied tension the fabric ruptures to either side of the seam with no indication of filaments pulling out or fraying at the seam.

Hose seamed according to the method of the invention are comfortable, the relaxed straight seam, because of its great elasticity, easily conforming to the contour of the foot of the wearer. It is evident that the method applies equally as well and with even greater economic advantage to full-fashioned hosiery. A two-section curved mold could easily accommodate al normal sizes of full-fashioned hose. The addition of different dyeing assistants to the polyurethane would permit the provision of standard hose in several different colored seams, an aesthetic factor to considerable importance that is not easily accomplished with ordinary looped seams.

Thus, it is noted that the above disclosure affords several advantages. A novel and useful method of piecing together stretch fabrics without stitching is provided. The seam extends as the fabric is stretched, thus providing comfort to the wearer of the fabric while at the same time providing a pleasing appearance. The procedure is simple and inexpensive and the resulting seam is resistant to tear.

It is not intended that the invention be limited solely to details of the embodiment set forth above. It will be recognized that numerous modifications conforming to the spirit of the invention may be made. Therefore, it is intended that the invention be limited only by the scope of the following claims.

What is claimed is:

1. A process of stitchless piecing together textile fabric comprising the steps of:
    (a) overlapping portions of fabric,
    (b) placing at least a part of the overlapping fabric portions into a confined zone,
    (c) injecting a solution of urethane elastomeric resin into the said zone under pressure sufficient to cause said resin to penetrate into the filamentary interstices of the fabric portions,
    (d) heating the material in said zone to evaporate the solvent therefrom, and
    (e) removing the thus-joined fabric portions from said zone.

2. A process of stitchless piecing together textile fabric comprising the steps of:
    (a) overlapping portions of fabric,
    (b) placing at least a part of the overlapping fabric portions into a confined zone,
    (c) injecting a diisocyanate modified polyester of adipic acid and ethylene glycol dissolved in N,N'-dimethylacetamide, the diisocyanate constituting a mixture of 2,4-tolylene diisocyanate and diphenylmethane-4,4'-diisocyanate into the said zone under pressure sufficient to cause said resin to penetrate into the filamentary interstices of the fabric portions,
    (d) heating the material in said zone to evaporate the solvent therefrom, and
    (e) removing the thus-joined fabric portions from said zone.

References Cited

UNITED STATES PATENTS

| 2,118,522 | 5/1938 | Pitman | 156—304 |
| 2,584,493 | 2/1952 | Olsen | 156—304 X |
| 2,642,920 | 6/1953 | Simon et al. | 161—93 |
| 2,988,457 | 6/1961 | Gatcomb | 117—68 |
| 2,992,958 | 7/1961 | Yamaguschi | 156—307 X |
| 2,994,327 | 8/1961 | Otto et al. | 132—39 |

HAROLD ANSHER, *Primary Examiner.*

U.S. Cl. X.R.

156—157, 307, 331